United States Patent [19]
Obrist

[11] Patent Number: 5,558,784
[45] Date of Patent: Sep. 24, 1996

[54] METHOD FOR POSITIONING A WORK PIECE CARRIER MEMBER IN A MACHINING APPARATUS AND A WORK PIECE CARRIER MEMBER ADAPTED TO BE POSITIONED IN A MACHINING APPARATUS

[75] Inventor: Basil Obrist, Gontenschwil, Switzerland

[73] Assignee: Erowa AG, Reinach, Switzerland

[21] Appl. No.: 279,803

[22] Filed: Jul. 25, 1994

[30] Foreign Application Priority Data

Aug. 5, 1993 [DE] Germany ............... 43 26 275.9

[51] Int. Cl.$^6$ ............... B23H 1/00; B23Q 3/18; B23Q 7/18; B23Q 16/00
[52] U.S. Cl. ............... 219/69.12
[58] Field of Search ............... 219/69.11, 69.12, 219/69.16, 69.17.69.2; 198/345.1, 345.2, 345.3; 29/33 P; 33/503, 504, 505

[56] References Cited

U.S. PATENT DOCUMENTS

| | | | |
|---|---|---|---|
| 4,656,326 | 4/1987 | Ramsbro | 219/69.12 |
| 4,757,178 | 7/1988 | Iwasaki et al. | 219/69.11 |
| 4,786,776 | 11/1988 | Ramsbro | 219/69.12 |
| 5,068,972 | 12/1991 | Herzog et al. | 33/503 |
| 5,186,303 | 2/1993 | Seto et al. | 198/345.1 |
| 5,310,038 | 5/1994 | Akaike et al. | 198/345.3 |
| 5,418,345 | 5/1995 | Adamski | 219/69.17 |
| 5,426,861 | 6/1995 | Shelton | 33/503 |

FOREIGN PATENT DOCUMENTS

| | | | |
|---|---|---|---|
| 65247 | 11/1982 | European Pat. Off. . | |
| 63-134124 | 6/1988 | Japan | 219/69.12 |
| 2-100831 | 4/1990 | Japan | 219/69.11 |
| 3-281122 | 12/1991 | Japan | 219/69.11 |

*Primary Examiner*—Geoffrey S. Evans
*Attorney, Agent, or Firm*—Tarolli, Sundheim, Covell, Tummino & Szabo

[57] ABSTRACT

In a method of positioning a work piece carrier member with regard to a machining apparatus, it is provided to insert the work piece carrier member into the machining apparatus and to fix it there in a position which at least approximately corresponds to a desired nominal position. Thereafter, the effective position of the work piece carrier member is determined by scanning two reference marks provided on the work piece carrier member. The determination of the exact position of the work pieces received in the work piece carrier member is carried out in a separate measuring and aligning station. The positional data thus determined are transferred to the machining apparatus. The effective position of the work pieces received in the work piece carrier member can be calculated on the basis of the position of the reference marks. Further there is a work piece carrier member comprising at least two reference marks located in a certain horizontal distance from each other. Thereby, the exact effective position of the work piece carrier member in X- and Y-direction as well as regarding its angular orientation around the Z-axis can be easily determined. Thereby, the need is removed to bring the work piece carrier member in an exactly predetermined position with regard to a machining apparatus.

27 Claims, 3 Drawing Sheets

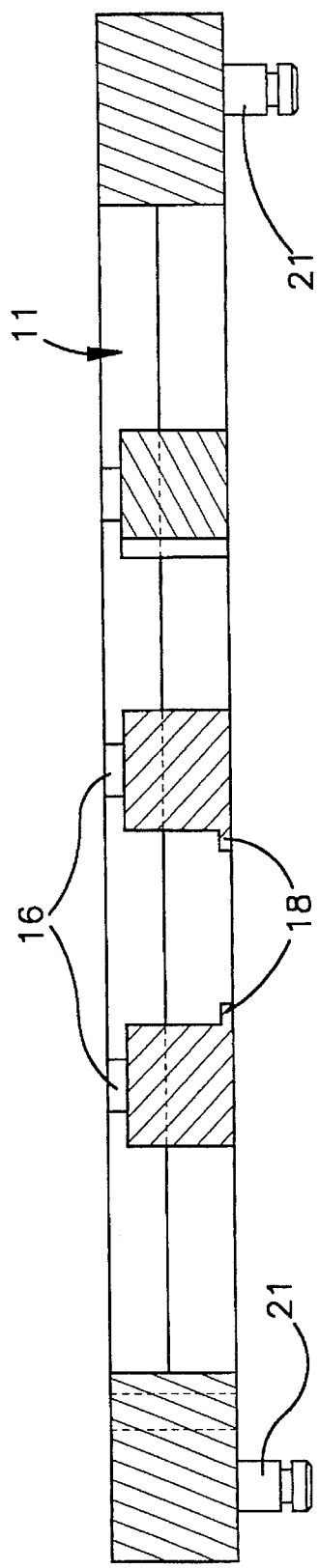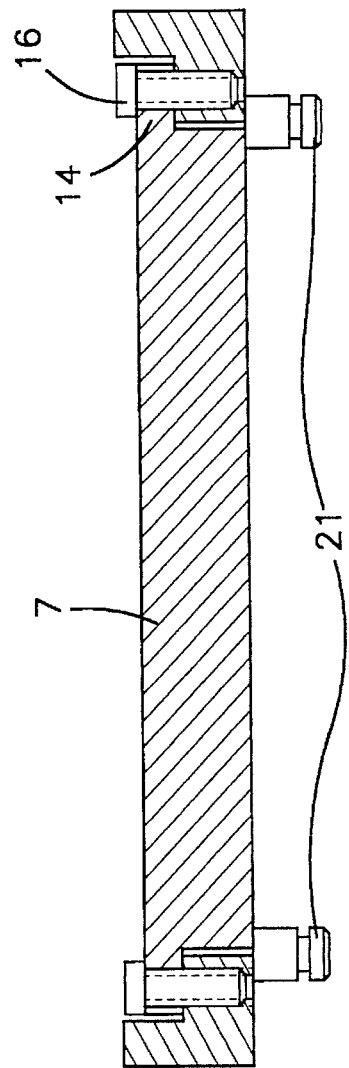

METHOD FOR POSITIONING A WORK PIECE CARRIER MEMBER IN A MACHINING APPARATUS AND A WORK PIECE CARRIER MEMBER ADAPTED TO BE POSITIONED IN A MACHINING APPARATUS

FIELD OF THE INVENTION

The present invention refers to a method for positioning a work piece carrier member in a machining apparatus, as well as a work piece carrier member adapted to perform this method. More-over, the invention refers to the use of such a work piece carrier member for precisely positioning work pieces within the work area of a machining apparatus.

In order to operate a machining apparatus for machining a work piece without significant interruption, the work pieces to be machined are clampingly fixed to and received in a work piece carrier member before the work piece carrier member is fixed in the afore mentioned machining apparatus. This operation preferably takes place in a specially adapted measuring and aligning station in which the work pieces are fixed in the work piece carrier member; thereafter, the exact position of the work pieces with regard to the work piece carrier member is determined and stored. Usually, the work piece carrier member is provided with clamping means which set the position of the work piece carrier member, not only in the measuring and aligning station, but also in the machining apparatus. In other words, the afore mentioned clamping means, or at least one thereof, which serve(s) as positioning means too, are the reference with regard to which the position of the work pieces received in the work piece carrier member is determined and stored.

In most cases, these positioning and clamping means are constituted by clamping pin members projecting from the work piece carrier member and engaging correspondingly arranged clamping and positioning apertures provided in or at the work table of a machining apparatus during clamping the work piece carrier member on this work table; thus, the work piece carrier member and, thereby, the work pieces received in the work piece carrier member are fixed in a well defined position on the work table of a machining apparatus with regard to a coordinate system or reference grid assigned to the machining apparatus. It is understood that the positioning apertures can be provided on the work piece carrier member and the positioning pins or studs on the work table of the machining apparatus.

The exact position of each work piece with regard to the work piece carrier member usually is defined by two axes running perpendicularly to each other in X- and Y-direction as well as by the angular orientation around the Z-axis, i.e. an axis running through the intersection of the X- and Y-axes in perpendicular direction. Even if the position of the work piece carrier member and the work pieces received therein, respectively, in the direction of the Z-axis is also important during the machining of a work piece, it is less critical as far as the positioning and exact determining of the position, respectively, is concerned.

PRIOR ART

Methods of positionally defined clamping of work piece carrier members receiving one or a plurality of work pieces to be machined are known in the art in numerous variants. The requirements in connection with such methods are strictly dependent of the desired machining accuracy of the work pieces. A further criterion: If a work piece has to be machined in several steps by means of a plurality of machining apparatuses which can be entirely different from each other, the work piece carrier member must be clamped to and removed from, respectively, each machining apparatus. Thereby, besides the absolute positional accuracy, first and foremost the repetitional positional accuracy of a work piece with regard to the coordinate system or reference grid of the machining apparatus is of paramount importance.

In connection with the following observations as far as the process or method of positioning a work piece carrier member in a machining apparatus and/or a measuring and aligning station is concerned, further as far as the design and construction of the work piece carrier member itself is concerned, it is particularly assumed that a machining accuracy of the work pieces received in the work piece carrier member within the limits of a few thousands of millimeters is required and should be realized.

In German Pat. No. 31 15 586, a two part work piece clamping system is disclosed which is suited to clampingly receive particularly work pieces with small dimensions. This clamping system comprises a chuck member as well as a work piece carrier member adapted to be connected to the chuck member in a well defined position. Therefor, the chuck member is provided with a number of projecting positioning studs or pins which engage a corresponding number of correspondingly located positioning apertures provided in the work piece carrier member. By means of the cooperation of two of these pairs of studs or pins and apertures, an exactly defined position of the work piece received in the work piece carrier member with regard to the chuck member is ensured. With the help of a first pin or stud/aperture pair, the exact position of the work piece in X- and Y-direction is determined, while the other pin or stud/aperture pair determines the angular orientation of the work piece around the Z-axis.

In order to achieve a high positional accuracy with such a clamping system, it is absolutely necessary that not only the centering pins or studs, but also the centering apertures cooperating with the centering pins or studs are located relative to each other with a high degree of precision. Only by this measure, a reliable cooperation of the centering pins or studs with the centering apertures is ensured. However, in this way, a very high manufacturing precision is required.

A further problem in such a centering system is presented by the usually conically designed centering pins or studs, because the position in X- and Y-direction is defined by each centering stud or pin/aperture pair independently from each other, with the result that the geometric position of the work piece carrier member with regard to the clamping chuck member is over defined.

With clamping systems of this kind having large dimensions, e.g. work piece carrier menders of a frame like design, these problems are even more pronounce. In the interest of a positioning as stable and accurate as possible, the individual pin/aperture pairs are located as far away from another pin/aperture as possible. Thus, the disadvantage occurs in such a design that the obtainable positioning accuracy is impaired e.g. by thermal influences with the result that in a clamping system having e.g. a frame like work piece carrier member with a length and/or width of, let's say, 50 cm, a positional error of a work piece received in the work piece carrier member in the region of several hundreds of millimeters can occur.

In order to minimize these problems, the applicant has proposed and disclosed a clamping system in the EP-A2 Nr.

0,403,428 by means of which the disadvantages mentioned above can be more or less avoided. This design comprises a work piece carrier member in the form of a frame like carrier unit provided with centering apertures. The centering apertures cooperate with correspondingly located centering pins arranged on the surface of a work table of a machining apparatus. Thereby, a first group of centering apertures and centering pins is provided which defines the position of the work piece carrier member with regard to the machining apparatus in X- and Y-direction and, thereby, sets the origin of a reference coordinate system or grid. In order to define the angular orientation of the work piece carrier member around the afore mentioned origin, i.e. around the Z-axis, there is provided a second group of centering apertures and centering pins located in a certain distance in X-direction from the afore mentioned first group of centering apertures and centering pins. In order to additionally define the angular orientation around the Z-axis, particularly in the case of very large work piece carrier members, a still further group of centering apertures and centering pins can be provided which is located in a certain distance in Y-direction from the afore mentioned first group of centering apertures and centering pins. By such a design of the clamping system, a very high positional accuracy of the work piece carrier member with regard to a machining apparatus can be achieved in which a thermally caused length variation is not reflected in a undefined shift of the origin of the system.

All the statements and explanations given herein before have referred to a precise and well defined cooperation of the centering elements during the clamping process, i.e. the positionally defined location of the work piece carrier member with regard to a machining apparatus. This assumption was based on the fact that, by a defined cooperation of the centering elements during the clamping process, i.e. the positionally defined location of the work piece carrier member with regard to a machining apparatus, automatically a correspondingly precise positioning of the work piece carrier member and the work pieces received therein, respectively, is achieved.

However, practice has shown that, under certain circumstances, even in the case of a stable well defined origin of the work piece carrier member, the position of the work pieces received in such a work piece carrier member with regard to the centering elements and the origin defined by these centering elements, respectively, can vary within the limits of several hundreds of millimeters.

The reasons therefor, first and foremost, probably can be found in thermally caused dimension variations of the work piece carrier member and/or of the work table of the machining apparatus. If the dimension of the work piece carrier member is varied under the influence of heat, the position of the work pieces received in the work piece carrier member is shifted with regard to its origin. The more the distance between a work piece received in a work piece carrier member and the origin thereof is, the more is the absolute positional error. Moreover, in the case of a thermally caused dimension variation of the work piece carrier member, the distance between the centering elements provided on the work piece carrier member is changed. A thermally caused variation of the dimension of the work table of a machining apparatus is reflected by a variation of the distance between the centering apertures or centering pins provided on said work table. Even the mechanical machine origin defined by the centering elements provided on the work table of the machining apparatus can shift with regard to the theoretically correct origin under thermal influences.

All these problems are even more pronounced in the case of geometrically over defined clamping systems, e.g. as disclosed in German Pat. No. 31 15 586. Moreover, a different thermal expansion coefficient between the work piece carrier member and the work table of the machining apparatus results in further inaccuracies. If further factors add to these problems, e.g. heavy weight of the work pieces to be clamped and/or high clamping forces, the material of the work piece carrier member could be elastically deformed with the result that the positional accuracy of the work piece carrier member with regard to the machining apparatus is further impaired. It must not especially emphasized that larger clamping systems incorporating larger work piece carrier members react stronger on these negative factors than smaller ones.

Additionally, care must be taken to manufacture such work piece carrier members, usually consisting of a plurality of individual elements, of absolutely identical steel material, since steel material originating from different manufacturing batches can show a different behavior as far as thermal expansion and/or elasticity is concerned.

Furthermore, other sources of errors well known in the art must be taken into consideration; all these errors can sum up, in the worst case, in such a way that the final positional accuracy of a work piece carrier member and the work pieces received therein, respectively, with regard to a machining apparatus is no longer within the required limits. Some possible causes of such further errors are:

tolerances in manufacturing of the centering pins;

tolerances in manufacturing of the centering apertures;

tolerances in connecting the centering pins at the work piece carrier member and/or in locating the centering apertures relative to the work table of a machining apparatus.

In order to minimize all these tolerances, a very high expenditure must be taken during the manufacture of such a high precision clamping system; the results are correspondingly high costs for the centering elements (cooperating pairs of pins and apertures) as well as for the entire work piece carrier member.

In order to avoid all the disadvantages discussed herein before, it would be desirable if the positional reference of the work piece carrier member could be completely isolated from and made independent of the clamping and fixing means required to connect the work piece carrier member on the work table of a machining apparatus. In such a case, this means in other words that the inevitably present inaccuracy in clamping the work piece carrier member to the work table of a machining apparatus and the discrepancy between the theoretic coordinate origin of the machining apparatus and the mechanic work piece carrier member coordinate origin mechanically fixed by the position and cooperation of the positioning and clamping elements no longer has any effect on the positional accuracy of the work piece carrier member and/or the machining accuracy of the work pieces received therein. Moreover, it would be desirable to replace the centering elements known in the art which are very expensive to manufacture by simpler ones or to completely omit them. A final goal to be achieved would be to determine possibly occurring dimensional variations of the work piece carrier member and variations in the position of the work pieces received in the work piece carrier member, respectively, with reference to the theoretical coordinate origin of the machining apparatus and to arithmetically correct the coordinates of the work pieces received in the work piece carrier member in relation to these dimensional variations of the work piece carrier member and variations in the position of the work pieces received in the work piece carrier member.

OBJECTS OF THE INVENTION

It is an object of the invention to provide a method for positioning a work piece carrier member in a machining apparatus by means of which the position of the work piece carrier member and, thereby, the work pieces received therein with regard to the machining apparatus can be set with more accuracy than possible before.

It is a further object of the invention to provide a work piece carrier member adapted to clampingly receive a work piece or a plurality of work pieces; whose position with regard to a machining apparatus can be easily and exactly determined.

SUMMARY OF THE INVENTION

To achieve these and other objects, the invention provides a novel method for positioning a work piece carrier member in a machining apparatus. According to the invention, first, the work piece carrier member is inserted into the machining apparatus in a position which corresponds at least approximately to a preselected nominal position. Then, the work piece carrier member is positionally fixed in the position which corresponds at least approximately to the afore mentioned preselected nominal position. Now, the effective position of the work piece carrier member with regard to a nominal reference axis of the machining apparatus is determined and the coordinates of the determined effective position are stored.

The invention further provides a work piece carrier member adapted to clampingly receive a work piece or a plurality of work pieces. The work piece carrier member is adapted to be positionally fixed on the work table of a machining apparatus for machining work piece and the work pieces, respectively, received in the work piece carrier member. The work piece carrier member is provided with at least two reference marks located on the work piece carrier member in a horizontal distance from each other to determine the effective position of the work piece carrier member in X- and Y-direction as well as with regard to its angular orientation around the intersection of the X- and Y-axes, i.e. the Z-axis.

By this method and by means of such a work piece carrier member, it is possible to exactly determine and set the position of the work pieces to be machined independently from tolerances of the work piece carrier member, of its clamping and positioning elements and of thermal influences.

In a preferred embodiment of the method, it is additionally provided that, moreover, after fixing the work piece carrier member in the machining apparatus and prior to machining the work pieces received in the work piece carrier member, the distance between the afore mentioned :reference marks is measured and compared to the distance between the reference marks determined at the measuring and aligning station. If the deviation of these two values exceeds a certain limit, the coordinates of the work pieces received in the work piece carrier member is arithmetically corrected in X- and/or Y-direction in dependence of the measured distance deviation. Thus, thermally caused length variations of the work piece carrier member can be compensated for to a high degree.

Due to the provision, of two reference marks located in a certain horizontal distance from each other on the work piece carrier member, the effective position thereof can be exactly determined not only in X- and Y-direction, but also with regard to its angular orientation around the Z-axis. The result is that the centering and fixing elements of the work piece carrier member can be manufactured with a much simpler design; accordingly, the whole work piece carrier member is much less expensive than high precision work piece carrier menders known in the art without the disadvantage that the positional accuracy of the work piece carrier member is impaired.

In a preferred embodiment of the work piece carrier member, it is provided that the clamping frame member thereof be manufactured of one piece. Thereby, such a design has the advantage that the entire essential part of the work piece carrier member consists of the same material; in other words, that no different materials having differing characteristics must be used. Moreover, no tolerances in assembling the work piece carrier member can occur.

BRIEF DESCRIPTION OF THE DRAWINGS

In the following, an embodiment of the invention will be further described, with reference to the accompanying drawings, in which:

FIG. 2 shows a longitudinal sectional view of the work piece carrier member of FIG. 1, but without the work pieces clamped therein, taken along the line A—A in FIG. 1;

FIG. 3 shows a cross sectional view of the work piece carrier member of FIG. 1, but without the work pieces clamped therein, taken along the line B—B in FIG. 1.

DETAILED DESCRIPTION OF A PREFERRED EMBODIMENT

Figure 1:
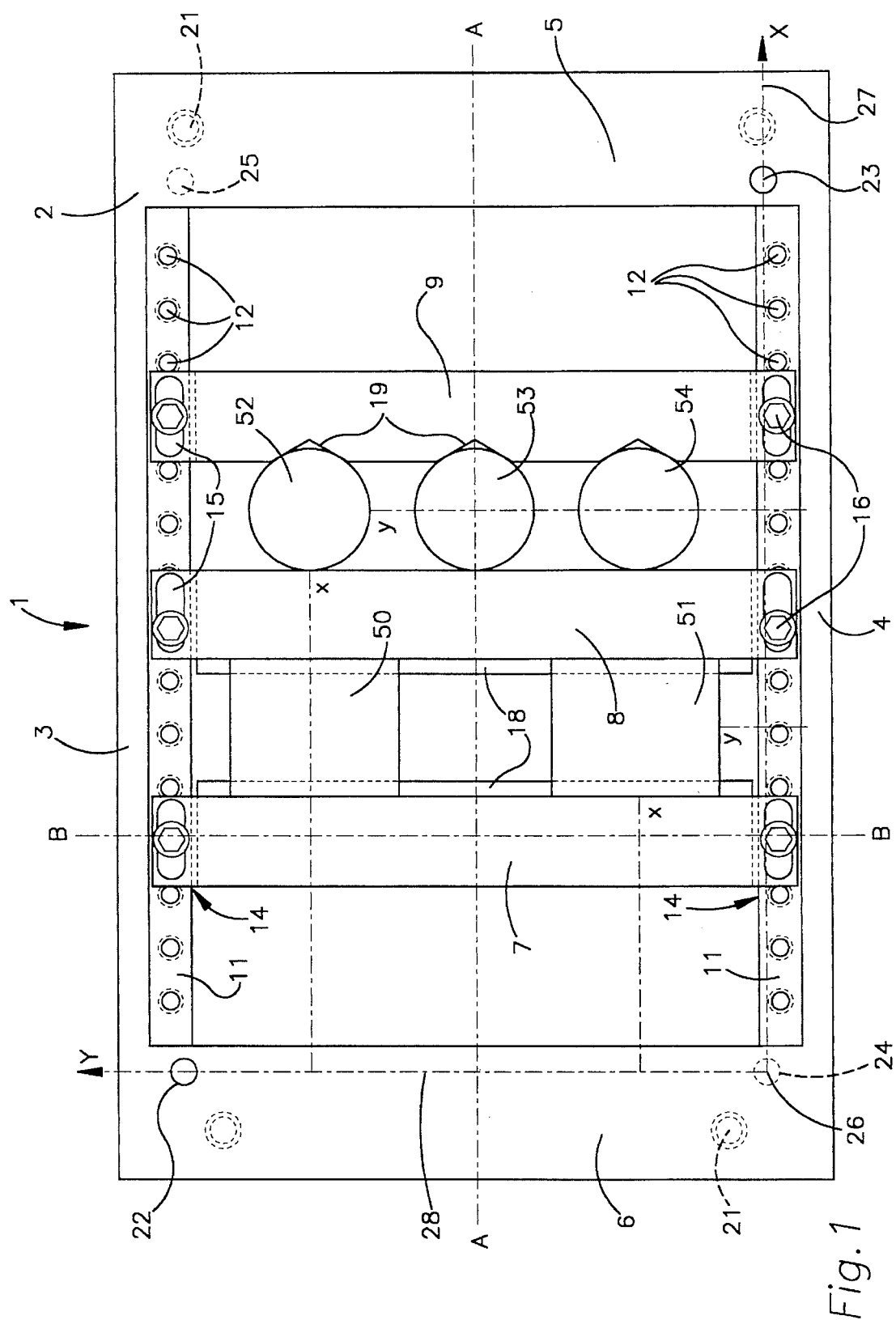
FIG. 1 shows a top view of a schematically drawn work piece carrier member.

FIG. 1 shows an example of a work piece carrier member 1 in a schematic top view. The work piece carrier member 1 essentially consists of a rigid clamping frame member 2 of generally rectangular shape which can be made of one piece and comprising two lateral frame members 3 and 4, two cross frame members 5 and 6 as well as a plurality of clamping bar members 7, 8 and 9. Between the first clamping bar member 7 and the second clamping bar member 8, two rectangular parallelepiped shaped work pieces 50 and 51 are clamped, and between the second clamping member 8 and the third clamping member 9, three cylinder shaped work pieces 52, 53 and 54 are clamped.

The two lateral frame members 3, 4 are provided each with a step shaped recess 11 running along their edges facing the interior of the clamping frame and being equipped with threaded bores 12. In order to enable the three clamping bar members 7, 8 and 9 to be fixed to the clamping frame member 2, both ends of the clamping bar members 7, 8 and 9 are provided with a short supporting arm member 14 incorporating a longitudinal slot 15. The clamping bar members 7, 8 and 9 rest with the afore mentioned supporting arm members 14 in the recesses 11 of the lateral frame members 3 and 4 and are fixed thereto by means of screws 16 penetrating the assigned longitudinal slot 15 and received in one of the threaded bores 12 of the lateral frame members 3 and 4.

Two of the three clamping bar members, i.e. the members 7 and 8, are provided with a projecting rib member 18 running along one of its lower edges and serving as a stop member on which the work pieces 50 and 51 to be clamped can rest during the clamping process. The third clamping bar member 9 is provided with V-shaped recesses 19 in which cylinder shaped bodies 52, 53, 54 can be received. It is understood that the three clamping bar members 7, 8 and 9 are but exemplary embodiment and many other designs of clamping bar members can be used within the scope of the present invention.

In the embodiment discussed herein, the work piece carrier member 1 is provided with four clamping elements 21 projecting from the lower surface of the clamping frame member 2 and serving for fixing the work piece carrier member 1 in the measuring and aligning station and in the machining apparatus. The four clamping members 21 are generally arranged in the region of the four edges of the clamping frame member 2, and the distance between the two clamping members 21 provided on the left side lateral frame member 6 is somewhat smaller than the distance between the two clamping members 21 provided on the right side lateral frame member 5 in order to provide for an unambiguous orientation of the work piece carrier member 1 in the measuring and aligning station and in the machining apparatus. The clamping members 21 serve for coarsely centering and positioning the work piece carrier member 1 with reference to the measuring and aligning station and the machining apparatus, respectively.

Basically, such work piece carrier members 1 are well known in the art. For instance, a work piece carrier member of this kind is disclosed in U.S. Pat. No. 5,201,502. Thus, it is not necessary to further describe details of such a work piece carrier member. The arrangement and the principle of the clamping members 21 shown in the drawings are for illustration only; it is understood that numerous other designs of clamping members could be used. For example, it would also be possible not to provide the work piece carrier member 1 with clamping and/or centering members at all, but to provide the measuring and aligning station as well as the machining apparatus with suitably designed clamping and/or centering elements.

An essential characteristic of the present invention, however, is that the work piece carrier member 1 is provided with two reference marks. In the present example, each of the two cross frame members 5 and 6 of the clamping frame member 2 are provided with a reference mark in the form of a continuous bore 22 and 23, respectively. These two reference bores 22 and 23 are located diagonally opposite to each other in the region of two corners of the clamping frame member 1. The continuous bores 22, 23 serve as reference marks and help to define the position of the work piece carrier member 1 in X-direction, in Y-direction as well as regarding its angular orientation around the Z-axis. Moreover, in FIG. 1, two further continuous bores 24 and 25 are outlined in broken lines. These two additional continuous bores 24, 25 are located in the region of the two remaining opposite corners of the clamping frame member 2. Thereby, it should be pointed to the possibility that the clamping frame member 2 may be provided with three, four or even more continuous reference bores.

A coordinate system or reference frame 26 which is defined by the two reference marks in the form of continuous reference bores 22, 23 is schematically shown in FIG. 1 by an abscissa 27 (X-axis) and an ordinate 28 (Y-axis); the Z-axis runs along a line perpendicular to the X- and Y-axes through the intersection or origin thereof. To illustrate the position (s) of the clamped work pieces 50, 51, 52, 53 and 54 with reference to the coordinate system 26, a dash-dot line designated with x is drawn from the rectangular parallelepiped shaped work piece 51 to the ordinate 28 and a dash-dot line designated with y is drawn from the rectangular parallelepiped shaped work piece 51 to the abscissa 27. Correspondingly, equivalent lines are drawn for the uppermost cylinder shaped work piece 52.

In FIG. 2, the work piece carrier member 1 is shown in a longitudinal sectional view along the line A—A in FIG. 1. For the sake of clarity, the work pieces clamped by means of the clamping frame member 2 and shown in FIG. 1 as well as several hidden lines are not shown in FIG. 2. From this figure, two of the four downwardly projecting clamping elements 21 are evident. As already mentioned, these clamping elements serve, on the one hand, for coarsely positioning the work piece carrier member 1 with reference to a measuring and aligning station and a machining apparatus, and, on the other hand, to firmly fix the work piece carrier member 1 to a work table of a measuring and aligning station and a machining apparatus, respectively. The real fixing and clamping operation is performed mechanically, e.g. by the force of springs, and the releasing of the clamping elements is performed pneumatically. Thus, it is ensured that the work piece carrier member remains fixed in its position, even if there is a leak in the pneumatic or hydraulic system or in the case of an interruption in the electric power supply. Preferably, the clamping arrangement is designed self-locking such that the work piece carrier member 1 is safely held in position also in the case of failure of the electric and/or pneumatic power supply.

In FIG. 3, the work piece carrier member 1 is shown in a cross sectional view along the line B—B in FIG. 1. In this view, the clamping bar member 7 is shown in a longitudinally sectioned view, illustrating its longitudinal profile.

Figure 4:
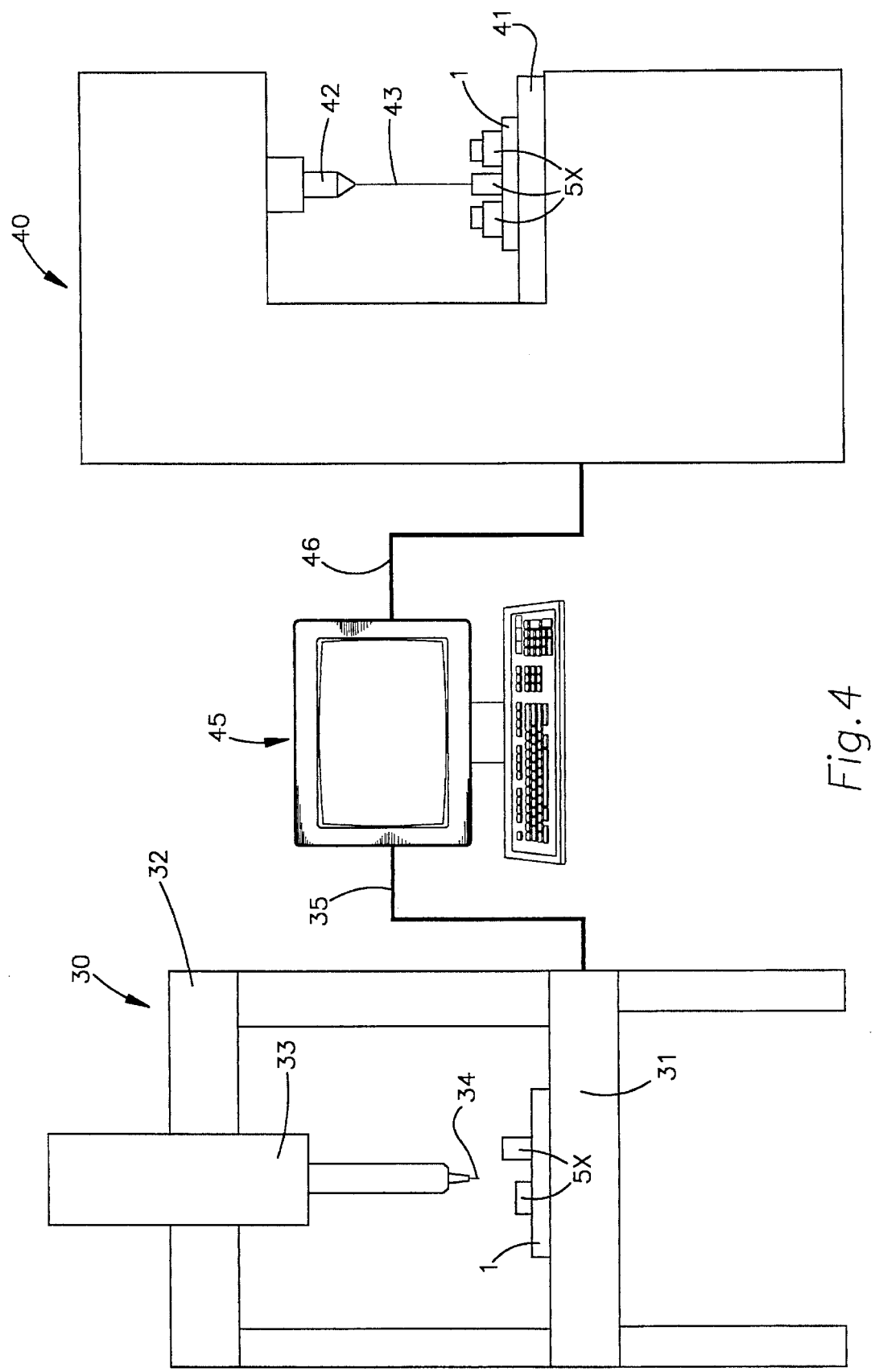
FIG. 4 shows a strictly schematic representation of a measuring and aligning station as well as of a wire erosion apparatus equipped with a work piece loaded work piece carrier member and of a computer.

In FIG. 4, there is shown, in a very schematic manner, a measuring and aligning station 30, a wire erosion apparatus 40 as well as a computer 45. The measuring and aligning station 30 serves, as is already implied by its designation, for determining the exact position of the work pieces 5x received in the work piece carrier member 1 with reference to the work piece carrier member 1. As such measuring and aligning stations 30 as well as the measuring and aligning proceeding for determining the position of the work pieces are known in the art and do not form, per se, an essential part of the invention, the following explanations are limited to those facts which are essential for the invention.

The measuring and aligning station 30 essentially comprises a measuring table 31 as well as a measuring arm member 33 supported by a frame structure 32. The measuring arm member 33 is provided with a measuring caliper 34 mounted to its free end. The computer 45 required for the operation of such a measuring and aligning station 30 is connected to the latter one by means of a symbolically shown data conductor 35. The measuring arm member 33 and, thereby, the measuring caliper 34, are displaceable in X-, Y- and Z-direction. As is well known to any person skilled in the art, the actual position of the measuring arm member in X- and Y-direction as well as its position with regard to a reference point can be determined and recorded with high accuracy with the help of measurement processing means well known in the art. In order to achieve an exactly defined positioning of the work piece carrier member 1 in Z-direction, the measuring table 31 is provided with a rest surface (not shown in detail) on which the work piece carrier member rests, preferably in the region of the clamping elements 21. Thus, the position of the measuring arm member 33 in Z-direction just not be determined because the height position of the work piece carrier member 1 is exactly known. On the other hand, the deflection or path of displacement of the measuring arm member can be digitally determined, processed and stored by means of the computer 45 without difficulties and with a high degree of accuracy.

Preferably prior to determining the position of the work pieces, indicated by reference numeral 5x and received in a work piece carrier member 1 as shown in FIG. 4, first, the exact positions of the reference bores 22 and 23 provided in the clamping frame member 2 are determined. For this purpose, the tip of the measuring caliper 34 is introduced in the reference bore 22 and 23, respectively, and the wall of the bore is contacted by the tip of the measuring caliper 34 at least three times, in positions which are preferably offset to each other by 90°–150°. As soon as the tip of the measuring caliper 34 touches the wall of the bore, the position of the measuring caliper 34 and the measuring arm 33, respectively, in X- and Y-direction is determined with regard to a reference origin of the measuring and aligning station 30 and stored. By determining three points of the wall of the reference bore 22 and 23, respectively, the axis of the bore can exactly and unambiguously be determined electronically. Thereafter, a virtual coordinate system or reference frame is arithmetically superimposed to the work piece carrier member 1, the determined centers of the two reference bores 22 and 23 serving as the basis of the said virtual coordinate system or reference frame.

Now, the position and the exact coordinates, respectively, of the work pieces 5X received in the work piece carrier member 1 can be exactly determined with regard to the afore mentioned virtual coordinate system or reference frame. For this purpose, the measuring caliper 34 is moved towards the clamped work pieces 5X at least twice, in different directions, preferably offset by 90°, in order to determine the position of the measuring arm member 33 upon the occurrence of a contact between the tip of the measuring caliper 34 and the surface of the work piece 5X in X- and Y-directions. Each measurement value is stored in the computer 45. In this way, the position and the coordinates, respectively, of each work piece 5X received in the work piece carrier member 1 is determined with regard to the afore mentioned virtual coordinate system or reference grid. The entire measuring proceeding is controlled by the computer 45 and the measured values are stored therein. In this way, the exact position and orientation of the work pieces 5X, with reference to the virtual coordinate system or reference frame imposed on the work piece carrier member 1 and defined by the position of the two reference bores 22 and 23, is known and ready for further processing.

In the present example, a wire erosion apparatus 40 is used as a machining means for machining the work pieces 5X received in the work piece carrier member 1. The essential parts and elements of such a wire erosion machine 40, evident from the strictly schematic view of FIG. 4, are a work table 41, preferably in the form of an open frame member as is well known in the art, a wire guiding head member 42 displaceable in X- and Y-directions, as well as the real erosion wire 43. The wire erosion apparatus 40 is connected to the computer 45 by means of a schematically shown data connection 46.

In the following, the process of determining the exact position of work pieces in a work piece carrier member and of exactly positioning the work piece carrier member 1 in a wire erosion apparatus 40 is explained in more detail, with reference to FIGS. 1 and 4. It is understood that the process of the invention or a similar process within the scope of the present invention can be performed also in connection with another machining apparatus and is not limited to the wire erosion apparatus 40 serving as an example herein after.

As a first step, the exact positions of the work pieces 50, 51, 52, 53 and 54 received in and clamped to the work piece carrier member 1 are determined with regard to the two reference bores 22 and 23 in the measuring and aligning station 30. Thereby, a virtual coordinate system or reference grid is superimposed on the work piece carrier member 1. Thereafter, the position coordinates of the work pieces, referenced to said virtual coordinate system, are stored in the computer 45 and transferred to the machining apparatus, in the present example the wire erosion apparatus 40, by means of the data connection 46. As a next step, the work piece carrier member 1 is removed from the measuring and aligning station 30, displaced to the wire erosion apparatus 40 and firmly clamped to the work table 41 thereof. An exact positioning of the work piece carrier member 1 in Z-direction, i.e. with regard to its height position, is performed by the cooperation of the plane surface of the work table 41 of the wire erosion apparatus 40 with the plane lower surface of the work piece carrier member 1.

By means of the clamping elements 21 provided on the work piece carrier member 1, the latter one is coarsely positioned in X- and Y-directions with regard to a reference origin of the wire erosion apparatus 40; in fact, a deviation of positional accuracy in the region of a few tenth of a millimeter does not have any significant influence. Should it be required under any particular circumstances to more exactly position the work piece carrier member 1 with regard to the above mentioned reference origin of the wire erosion apparatus 40, the work piece carrier member 1 can be provided with more exactly operating clamping and positioning means, e.g. as disclosed in U.S. Pat. No. 5,065, 991.

As the position of the reference bores 22 and 23 with reference to the position of the clamping elements is known from the preceding measuring process performed in the measuring and aligning station 30, a clamping accuracy of the work piece carrier member 1 in the wire erosion apparatus 40 within the limits of a few tenths of a millimeter is sufficient to ensure that the wire erosion apparatus 40 can find the approximate location of the reference bores 22 and 23 and can introduce the erosion wire 43 through the reference bore 22 and 23, respectively, in a known way, e.g. by means of a liquid jet guiding the erosion wire 43 as is well known in the art. Thereafter, well known in the art too, the erosion wire 43 is collected at the underside of the work piece carrier member 1 and tensioned.

As soon as the erosion wire 43 is grasped and tensioned, the erosion wire 43 is brought into contact with the wall of the reference bores 22 by relatively moving the erosion wire 43 and the work piece carrier member 1 relatively to each other. Such a relative movement preferably takes place three times in order to ensure that the erosion wire 43 touches the wall of the reference bore 22 at locations which are offset to each other by 90°–150°. By measuring the resistance between the erosion wire 43 and the work piece carrier member 1, it can be exactly determined at which point of deflection of the measuring arm member 33 and at which exact X/Y-position thereof, respectively, a contact between the erosion wire 43 and the wall of the reference bore 22 occurs. By means of this method, based on the position of these three contact points, the center of the reference bore 22 can be exactly computed. This method has the further important advantage that the position of the reference bores 22, 23 which are the basis of the afore mentioned virtual coordinate system or reference grid are determined with the help of the real machining tool, i.e. the erosion wire 43, with the result that in this way positional errors are minimized and mechanical tolerances avoided.

Thereafter, in the same way as described above, the exact position of the center of the reference bore 23, and, if necessary of further reference bores 24, 25, is/are determined. On the basis of these measurements, the afore mentioned virtual coordinate system or reference frame previously superimposed on the work piece carrier member 1 is recognized by the machining apparatus, i.e. in the present example the wire erosion apparatus 40. Thus, this virtual coordinate system or reference frame, together with the work piece position coordinates previously determined in the measuring and aligning station 30, can be superimposed to the reference coordinate system of the wire erosion apparatus 40. The result is that, finally, the exact positions of the work pieces 50, 51, 52, 53 and 54 received in the work piece carrier member 1 with regard to the X- and Y-axis and regarding its angular orientation around the Z-axis is known to the wire erosion apparatus 40. Based on this data, the real machining process can start.

In order to perform such a process of exact positional location of the work pieces received in a work piece carrier member with regard to reference marks provided thereon, it is required that the machining apparatus, in the present example the wire erosion apparatus 40, has the corresponding software at it's disposal. Since such programs are well known in the art, the need is removed to further describe such software in detail.

The exchange of data between the measuring and aligning station 30 and the machining apparatus 40 can be performed, if desired, by means of a software storage means, e.g. a floppy disk, if the machining apparatus 40 comprises a suitable storage means reading unit, e.g. a floppy disk drive.

The method according to the invention ensures that the positions of the work pieces 50, 51, 52, 53 and 54 are exactly known with a previously unknown degree of accuracy prior to the start of a machining process, independently of the positional accuracy with which the work piece carrier member 1 is fixed to the machining apparatus 40, further independently of the tolerances unavoidable at the manufacturing of the work piece carrier member 1 and also independently of the tolerances occurring during the clamping and aligning of the work pieces 50, 51, 52, 53, 54 in the and with reference of, respectively, the work piece carrier member 1.

In the following, some further, not exclusive possibilities shall be illustrated which are offered by a process according to the invention or a process derived therefrom.

If the work piece carrier member 1 is provided with three reference bores 22, 23 and 24, the third reference bore 24 can be used as a cross check reference; thereby, this third reference bore 24 is measured in the same way as the two other reference bores 22 and 23, and a mean value is arithmetically derived from the results of these measurements.

If the work piece carrier member 1 is provided with four reference bores 22, 23, 24 and 25, it is possible, besides the determination of the exact location of the afore mentioned virtual coordinate system or reference grid, to determine possible length or width variations of the work piece carrier member 1 due to thermal influences; based on these further measurements, the virtual coordinate system or reference grid can be corrected accordingly.

The location of the reference bores can be freely selected according to the special circumstances. Thus, for instance, it is possible to provide the clamping bar members 7, 8 and/or 9 with reference bores. This would shown the advantage that the reference bores are closer to the work pieces to be machined, minimizing the influence of thermal length deviation.

According to a particular variant of the process of the invention, the origin of the virtual coordinate system or reference grid could be placed in the center of the work piece carrier member 1. In this way, it can be achieved that possibly occurring length deviations of the work piece carrier member 1, measured with regard to its origin, influence the overall accuracy only by maximally 50% of the entire length deviation.

In a preferred embodiment of the process according to the invention, it is provided that, after the work piece carrier member 1 having been fixed in the machining apparatus 40, the distance between the centers of the reference bores 22 and 23 are measured and compared to the distance there between measured at the measuring and aligning station 30. If a certain degree of deviation between the two measured distance occurs, the positions of the work pieces 50, 51, 52, 53 and 54 are arithmetically corrected by the machining apparatus 40, in dependency of the said measured deviation of distance between the reference bores 22 and 23. Thereby, the influences of for instance thermally caused length variations of the work piece carrier member 1 can be essentially fully compensated in X- direction as well as in Y-direction.

In a further embodiment of the process according to the invention, it is provided that the coordinates of the work pieces 5X determined in the measuring and aligning station 30 are transferred to and stored in an electronic storage means provided on the work piece carrier member 1. As a storage of this kind, semiconductor elements or magnetic strips could be suitable which can store the transferred information and data without the need to require a power supply means. The transformation of the data from the semi-conductor element or magnetic strip preferably is performed in a touchless way, e.g. by means of a carrier frequency system, while an inductive alternate current field may be provided for the transformation of energy. By the use of such storage elements, an unambiguous assignment of the relative data to the work pieces clamped in the work piece carrier member 1 can be realized.

In sum, it can be pointed out that the position in X- and Y-direction in which the work piece carrier member 1 is fixed to the measuring and aligning station and to the machining apparatus, respectively, is of minor importance because the position of the work pieces clamped in the work piece carrier member is well and exactly known with regard to at least two reference marks. In other words, this means that the work piece carrier member can inaccurately fixed to the work table of the measuring and aligning apparatus and to the work table of the machining apparatus, respectively, since, in the measuring and aligning apparatus, the virtual coordinate system or reference grid is created and, in the machining apparatus, the before created virtual coordinate system or reference grid is recognized and serves as a basis for the machining of the work pieces. In this way, it is possible to use much simpler clamping elements which can be manufactured in a much less expensive way.

An element which has a certain significance in such a process is the software as it has a decisive influence on the accuracy and the possibilities of corrections. However, with a well designed software, it is possible to determine the position of the virtual coordinate system or reference grid and, thereby, the position of the work pieces received in the work piece carrier member and to be machined with a nearly perfect accuracy.

Finally, it should be pointed out that, instead of the afore mentioned reference bores, other kinds of reference marks could be provided on the work piece carrier member 1. Such alternative reference marks could be in the form of projections, recesses, slots, optical marks or similar means which can be unambiguously recognized by a suitable position detection means.

What is claimed is:

1. A method for positioning a work piece carrier member with work pieces received therein in a machining apparatus, comprising the steps of:

determining and recording the coordinates of each of said work pieces received in said work piece carrier member with reference to a virtual coordinate system in a measuring and aligning station prior to positionally fixing said work piece carrier member in said machining apparatus, said virtual coordinate system being defined by at least two reference marks provided on said work piece carrier member which are a horizontal distance from each other;

transmitting the coordinates of each of said work pieces determined and recorded in said measuring and aligning station to said machining apparatus;

inserting the work piece carrier member into the machining apparatus in a position which corresponds at least approximately to a preselected nominal position and positionally fixing said work piece carrier member in said position;

determining the coordinates of an effective position for said work piece carrier member in said machining apparatus by scanning said at least two reference marks with regard to a nominal reference coordinate system of said machining apparatus and storing the coordinates of said effective position in said machining apparatus; and arithmetically superimposing said virtual coordinate system defined by said at least two reference marks provided on said work piece carrier member, together with the coordinates of each of said work pieces received in said work piece carrier member, onto said reference coordinate system of said machining apparatus.

2. A method according to claim 1 in which additionally the distance between said at least two reference marks provided on said work piece carrier member is measured and recorded in said measuring and aligning station.

3. A method according to claim 2 in which, after fixing said work piece carrier member in said machining apparatus, additionally the distance(s) between said at least two reference marks is/are measured and compared with the distance(s) between said at least two reference marks measured in said measuring and aligning station, whereby, in the case of a predetermined deviation of the measured distance(s), the coordinates of each of said work pieces received in said work piece carrier member are arithmetically corrected in said machining apparatus with regard to said virtual coordinate system.

4. A method according to claim 1 in which the position of said work piece carrier member in the Z direction in said measuring and aligning station and in said machining apparatus, respectively, is mechanically determined.

5. A method according to claim 1 in which the position of said work piece carrier member in the Z direction, in said measuring and aligning station and in said machining apparatus, respectively, is determined by scanning at least two reference features on said work piece carrier member which are a vertical distance from each other.

6. A method according to claim 1 in which the coordinates of each of said at least two reference marks are determined by mechanically or optically scanning each of said at least two reference marks at said measuring and aligning station.

7. A method according to claim 6 in which the coordinates of each of said work pieces received in said work piece carrier member are determined at said measuring and aligning station by a measuring caliper which touches each of said work pieces in at least two points which are offset from each other by an angle of 90°.

8. A method according to claim 6 in which the coordinates of each of said work pieces received in said work piece carrier member are determined at said measuring and aligning station by optical means which optically scans each of said work pieces in at least two points which are offset from each other by an angle of 90°.

9. A method according to claim 1 in which said machining apparatus is a wire erosion apparatus and each of said at least two reference marks is constituted by a continuous reference bore in said work piece carrier member, whereby each of said reference bores provided in said work piece carrier member is scanned by an erosion wire of said wire erosion apparatus to determine the position of said work piece carrier member in said wire erosion apparatus.

10. A method according to claim 9 in which, for determining the position of the center of each of said reference bores, a wall of each of said reference bores is touched by said erosion wire in three different points offset from each other by an angle of 90°–150°, whereby the position of said erosion wire is recorded as soon as said erosion wire touches the wall of each of said reference bores and the position of the center of each of said reference bores is arithmetically calculated from the position of the three touching points for each of said reference bores.

11. A method according to claim 1 in which the origin of said virtual coordinate system lies in the center of a straight line running through said at least two reference marks.

12. A method according to claim 1 in which the coordinates measured in said measuring and aligning station are transmitted by an interface member to said machining apparatus.

13. A method according to claim 1 in which the coordinates measured in said measuring and aligning station are recorded in a data storage means and are read into said machining apparatus by means for reading the data stored in said data storage means.

14. A method according to claim 1 in which the coordinates measured in said measuring and aligning station are recorded in a data storage means which is arranged on or connected to said work piece carrier member.

15. A method according to claim 14 in which the coordinates recorded in said data storage means are touchlessly read by reading means assigned to said machining apparatus and are stored in a memory means provided in said machining apparatus.

16. A method according to claim 1 in which said work piece carrier member is positionally fixed in said measuring and aligning station and/or said machining apparatus by mechanical means, and is released from said measuring and aligning station and/or said machining apparatus by pneumatic means.

17. A work piece carrier member adapted to clampingly receive a work piece or a plurality of work pieces, said work piece carrier member being adapted to be positionally fixed on work table means of a machining apparatus for machining said work piece or said plurality of work pieces, said work piece carrier member being provided with at least two reference marks located on said work piece carrier member a horizontal distance from each other, said two reference marks for determining the effective position of said work piece carrier member in the X, Y and Z directions, said work piece carrier member being approximately rectangular in shape and having at least two diagonally opposite corners, each of said diagonally opposite corners being provided with one of said at least two reference marks.

18. A work piece carrier member according to claim 17 in which said work piece carrier member is provided with three reference marks located in three corners of said work piece carrier member.

19. A work piece carrier member according to claim 17 in which each of said at least two reference marks is constituted by a continuous bore provided in said work piece carrier member.

20. A work piece carrier member according to claim 17 in which said work piece carrier member comprises a clamping frame member provided with stop means for positioning said work piece carrier member in the Z direction.

21. A work piece carrier member according to claim 20 in which said clamping frame member is provided at its lower surface with a rest surface adapted to define the position of said clamping frame member in the Z direction and which cooperates with a plurality of rest surfaces provided on a measuring and aligning station and said machining apparatus, respectively.

22. A work piece carrier member according to claim 21 in which said clamping frame member is made of one piece.

23. A work piece carrier member according claim 17 in which said work piece carrier member is provided with a data storage means for storing data which includes the coordinates of the work piece(s) received therein.

24. A work piece carrier member according to claim 17 in which said work piece carrier member is provided with clamping means adapted to clampingly fix said work piece carrier means in said measuring and aligning station and in said machining apparatus, respectively.

25. A work piece carrier member according to claim 24 in which said clamping means are simultaneously designed as centering elements for at least coarsely centering and unambiguously aligning said work piece carrier member in said machining apparatus.

26. A work piece carrier member according to claim 17 in which said work piece carrier member is provided additionally with at least two reference features located a known vertical distance from each other to determine the position of said work piece carrier member in the Z direction.

27. A work piece carrier member according to claim 17 in which said work piece carrier member serves as a work piece clamping member adapted to be fixed in a wire erosion machining apparatus for machining said work piece or said plurality of work pieces received in said work piece carrier member.

\* \* \* \* \*